United States Patent [19]

Hennells

[11] Patent Number: 4,662,616
[45] Date of Patent: May 5, 1987

[54] COMBINED CHECK AND EXHAUST VALVE FOR HIGH PRESSURE GAS SPRING

[75] Inventor: Ransom J. Hennells, Plymouth, Mich.

[73] Assignee: Rantom, Inc., Canton, Mich.

[21] Appl. No.: 757,969

[22] Filed: Jul. 23, 1985

[51] Int. Cl.$^4$ .............................................. F16F 9/43
[52] U.S. Cl. .................................. 267/64.28; 137/102; 188/322.21; 251/63.4
[58] Field of Search ............... 267/64.28, 64.11, 64.12, 267/64.13, 64.14, 64.15–64.27, 119, 130, 124, 137, 113, 118; 188/322.21; 137/102; 251/63.4, 63.5; 91/442

[56] References Cited

U.S. PATENT DOCUMENTS

| | | | |
|---|---|---|---|
| 3,034,527 | 5/1962 | Hennells | 137/102 |
| 3,281,138 | 10/1966 | Oster | 267/64.28 X |
| 3,519,011 | 7/1970 | Pennanen | 267/64.28 X |
| 4,257,580 | 3/1981 | Schnitzius | 267/64.28 |
| 4,342,448 | 8/1982 | Wallis | 267/64.28 X |
| 4,550,899 | 11/1985 | Holley | 267/119 |

Primary Examiner—Douglas C. Butler
Attorney, Agent, or Firm—Flynn, Thiel, Boutell & Tanis

[57] ABSTRACT

A gas spring unit having a housing, and a piston assembly slidably supported within and projecting outwardly of the housing. The housing and piston assembly cooperate to define therebetween a pressure chamber which is precharged with a high pressure gas, specifically nitrogen, for absorbing external shock forces as imposed on the piston assembly. A first passage, containing a one-way check valve, extends through the end cap of the housing to permit charging of the pressure chamber with high-pressure gas, and to additionally permit make up gas to be supplied to the chamber. A second passage extends through the end cap for relieving pressure within the pressure chamber, such as due to overload or when relief of pressure is desired. A movable discharge valve is associated with the second passage, and the opening and closing of the discharge valve is controlled by a control piston which is slidably disposed within the end cap and has opposite ends thereof exposed to the pressures within the first and second passages for controlling the position thereof, and hence controlling the position of the discharge valve.

23 Claims, 3 Drawing Figures

COMBINED CHECK AND EXHAUST VALVE FOR HIGH PRESSURE GAS SPRING

FIELD OF THE INVENTION

This invention relates to a gas compression spring designed for use with high internal pressures and, in particular, to an improved valve arrangement associated with the spring for permitting safe discharge of the internal pressure from the spring and relief of excessive internal pressure.

BACKGROUND OF THE INVENTION

At the present time, manufacturers who utilize large presses and dies, such as of the type used for forming large sheet metal body parts for automobiles, have attempted to reduce the press size by replacing conventional low-pressure gas springs (typically air springs) with higher pressure springs which are typically filed with nitrogen. This desire to utilize high-pressure gas springs is obviously predicated on the fact that such springs can be of significantly smaller size while still providing a large force-absorbing capacity due to the high internal gas' pressure which exists in the spring. These high-pressure springs, however, introduce serious concerns with respect to the safety of such devices and specifically the safety of operating personnel. This is important both during operation of the spring due to the pressure buildup therein during application of impact forces thereto, and also when handling of the spring such as during installation, maintenance or removal. Most known high-pressure springs do not contain control valves for providing safety against pressure overload, and at the same time providing convenient and safe procedures for discharging high-pressure fluid from the spring. Most manufacturers of such springs merely provide the spring with a one-way check valve which permits filling of the spring with a high-pressure gas such as nitrogen, and this check valve must then be manually held in an open position to permit relief of pressure from the spring when depressurization is desired. Having to perform such step is clearly undesirable when handling or maintaining of the spring unit is desired.

Accordingly, this invention relates to a high-pressure gas spring, specifically a nitrogen spring, and in particular to an improved spring having a valve arrangement which functions as a combined check and exhaust valve for permitting filling of the spring with a high-pressure gas, and for readily permitting depressurization of the gas spring substantially to atmospheric pressure in a safe and convenient manner. The valve arrangement additionally functions as a pressure release valve in that it will release excessive pressure from the gas spring in excess of a predetermined magnitude.

In the improved gas spring of the present invention, the valve arrangement employs a control piston which is slidably supported within a bore formed in the air spring housing. The control piston has an internal bore formed therein, and a one-way check valve is positioned therein. One end of this internal bore communicates with the outer end of the housing bore, which in turn communicates with a source of high-pressure gas. The other end of the internal bore communicates with the pressure chamber of the air spring. The high-pressure external gas source is capable of opening the one-way check valve for pressurizing the internal spring chamber, and for supplying makeup pressure in the chamber if a pressure loss occurs. An intermediate discharge passage extends from the pressure chamber to the inner end of the housing bore, and a valve element such as a ball is disposed within this inner end for closing off the intermediate discharge passage. A external discharge passage communicates between the inner end of the housing bore and a discharge reservoir (such as the atmosphere) which is at atmospheric pressure, this external discharge passage being of smaller cross section than the intermediate discharge passage. The source pressure is continuously supplied to the outer end of the housing bore and acts against the control piston for urging the latter towards the inner end, whereby the control piston maintains the valve element in a seated closed position so as to isolate the intermediate discharge passage from the housing bore. In the event of a pressure increase within the spring chamber in excess of a predetermined magnitude, than this is sufficient to urge the valve element and the piston into an open position and, since the external discharge passage is of a smaller cross section and hence effectively acts as a flow restriction, some of the high pressure gas accumulates within the inner end of the housing bore and acts on the control piston so as to move same away from the valve element and maintain the latter in its open position until the pressure in the spring chamber falls below the source pressure, at which time the source pressure moves the control piston back into its closed position.

With the arrangement of the present invention, as explained above, when it is desired to discharge the high-pressure gas from the air spring, such as for maintenance purposes, then the source pressure to the outer end of the housing bore is relieved so as to be substantially atmospheric. The higher pressure in the spring chamber then acts through the intermediate discharge passage and moves the valve element into an open position, whereupon the higher pressure then acts on the adjacent end of the control piston so as to move it away from the valve element so that the latter remains unrestricted in its open position. The high pressure hence then freely flows through the external discharge opening to the atmosphere until the pressure in the pressure chamber is substantially at atmospheric. When repressurization of the spring unit is desired, then a valve in the main supply line is opened so that pressure fluid is again supplied from the source to the outer end of the bore, which in turn moves the control piston against the valve element so as to seat it and hence close off the intermediate discharge passage from the external discharge passage.

The arrangement of the present invention hence provides a convenient and safe operation. Further, the valve arrangement is preferably integrated directly into the head plate of the spring housing so as to ensure that the spring is properly connected since the discharge valve is integrated with the one-way check valve used for controlling pressurization of the cylinder. This hence ensures that the spring unit cannot be improperly utilized and pressurized without ensuring the presence of the discharge control valve.

Other objects and purposes of the invention will be apparent to persons familiar with structures of this general type upon reading the following specification and inspecting the accompanying drawings.

Certain terminology will be used in the following description for convenience in reference only, and will not be limiting. For example, the word "upwardly", "downwardly", "rightwardly" and "leftwardly" will refer to directions in the drawings to which reference is made. The words "inwardly" and "outwardly" will refer to directions toward and away from, respectively, the geometric center of the spring unit and designated parts thereof. Said terminology will include the words specifically mentioned, derivatives thereof, and words of similar import.

DETAILED DESCRIPTION

Figure 1:
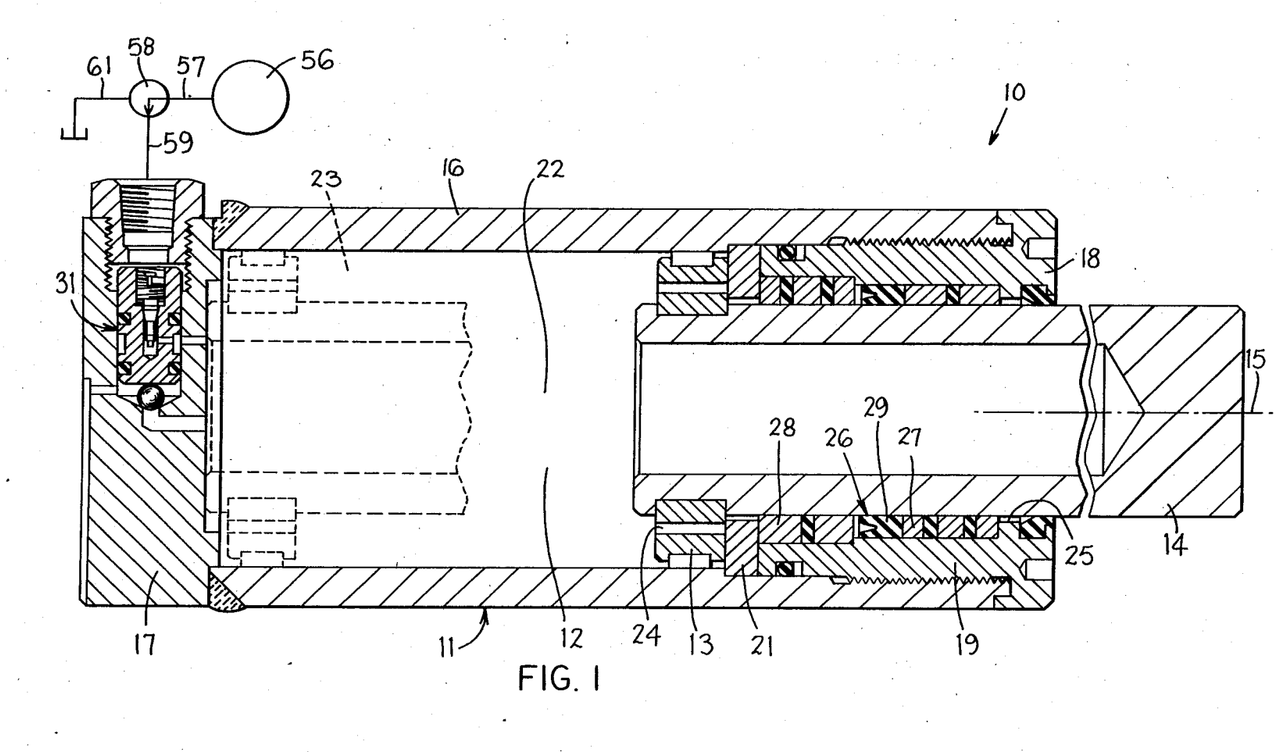
FIG. 1 is a central sectional view of the gas spring unit incorporating therein the improved valve arrangement of this invention.

FIG. 1 illustrates a gas spring unit 10 according to the present invention. The unit includes a substantially hollow housing 11 defining therein a pressure chamber 12. A piston 13 is disposed within the chamber 12 and is secured to the inner end of an elongated piston rod 14 which projects outwardly through one end of the housing, whereby the piston is supported for slidable movement along the longitudinal central axis 15 of the unit.

The housing includes a main body 16 which is of a tubular or sleevelike construction. The body 16 is closed at one end thereof by an end cap 17 which is fixed thereto, as by welding. The other end of body 16 has a further end cap 18 secured thereto, which end cap includes a sleevepart 19 which is received within and rigidly joined to the end of body 16, as by a threaded connection. An annular stop ring 21 which is stationarily positioned within the body 16 is disposed directly adjacent the inner end of the sleevepart 19.

The piston 13, which is fixed to the inner end of the piston rod 14 and is disposed in slidable engagement with the surrounding inner wall of the body 16, divides the interior compartment 12 into a pair of chambers, namely a main pressure chamber 22 and a balancing chamber or reservoir 23. The main pressure chamber 22 is defined rearwardly (that is leftwardly) of the piston 13 and in addition includes the hollow interior of the piston rod 14, whereas the reservoir or release chamber 23 is defined forwardly (that is rightwardly) of the piston and comprises the annular region between body 16 and piston rod 14, which annular region extends from the piston 13 to the stop ring 21. The piston 13 has one or more ports or orifices 24 extending axially therethrough to provide for unrestricted and continuous communication between the chambers 22 and 23 so as to balance the pressure on opposite sides of the piston.

The piston rod 14 projects outwardly of the housing through a central opening 25 formed in the end cap 18. This opening 25 has a packing structure 26 associated therewith for creating a slidable but sealed supportive engagement with the external surface of the piston rod. This packing structure 26, in the illustrative embodiment, includes a pair of axially spaced bushing rings 27 and 28 and an elastomeric seal ring 29 disposed therebetween.

The structure of gas spring 10, as described above, is explained in greater detail in my copending application Ser. No. 664 810, filed Oct. 25, 1984, the disclosure of which is incorporated herein by reference.

To permit filling and recharging of the pressure chamber 22 of the spring unit, and to additionally permit the high pressure within the spring unit to be relieved, either purposefully or in the event of a pressure overload, the spring unit 10 of this invention is provided with a valve assembly 31 associated therewith. This valve assembly 31 is preferably integrated directly into the housing, such as in the end cap 17, and provides control over the flow of pressure fluid both into and out of the pressure chamber 22.

Figure 2:
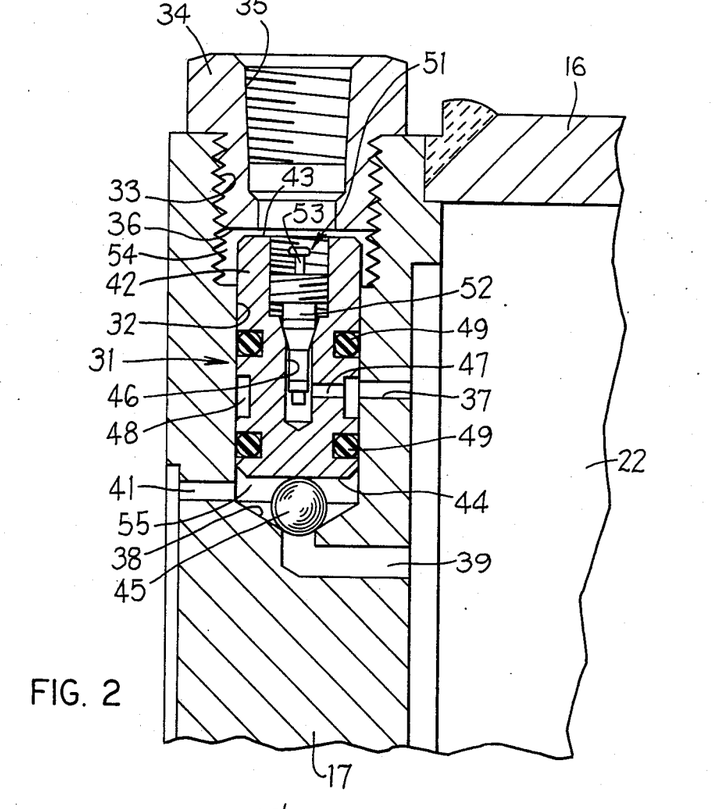
FIG. 2 is an enlarged sectional view of the valve arrangement.

The valve assembly 31 is disposed within a bore 32 as formed in the end cap 17, which bore has a threaded mouth 33 at the open end thereof for threadibly accommodating a conventional fitting 34, such as a threaded bushing. This fitting 34 has a standard threaded opening 35 therethrough which is aligned with and communicates with the bore 32 for permitting pressure fluid to be supplied thereto. The threaded opening 35 accommodates a conventional threaded end of a supply pipe, as described hereinafter. The fitting 34 has an inner end face 36 which effectively functions as a stop.

Bore 32, at a location intermediate the ends thereof, communicates with a transverse supply port 37 which is disposed in continuous communication with the pressure chamber 22.

The other or inner end of bore 32 terminates in an annular end wall 38 which is preferably of a concave conical configuration so as to function as a valve seat. This end wall 38, substantially at its center or apex, has one end of an intermediate discharge passage 39 formed therein, which passage 39 has its other end disposed in continuous communication with the pressure chamber 22. An external discharge passage 41 also communicates with the inner end of the bore 32, passage 41 at its other end communicates with the atmosphere or with a reservoir which is substantially at atmospheric pressure. The external discharge passage 41 has a cross-sectional area which is smaller than the cross-sectional area of intermediate passage 39, the area of passage 39 preferably being at least about twice the cross-sectional area of passage 41 for a purpose to be explained hereinafter.

The valve assembly 31 includes a control element 42 disposed for slidable but sealed support within the bore 32, which control element 42 is formed substantially as a piston or valve spool. The control piston 42 has oppositely directed end faces 43 and 44 formed on the opposite ends thereof, which end faces are of substantially the same area. The end face 43 is disposed adjacent the outer end of bore 32 and is disposed directly opposite the stop 36. The other end face 44 is disposed adjacent the inner end of bore 32 and is normally maintained in abutting engagement with a movable valve element 45, the latter preferably being formed as a spherical element or ball. This valve element 45 is of a diameter so as to sealingly seat against the valve seat 38 and hence close off the outer end of the intermediate passage 39 so as to prevent communication between the inner end of bore 32 and the pressure chamber 22.

The control piston 42 has a bore or opening 46 formed axially thereof, which bore 46 is of a stepped cylindrical configuration which opens inwardly from the outer end of the control piston and extends through only a selected axial extent of the piston. The outer end of this bore 46 hence is in direct communication with the opening 35. Bore or opening 46 has a one-way check valve 51 mounted therein, which check valve is disposed so as to permit flow therethrough into the lower part of opening 46 and thence through a radial passage 47 into a surrounding annular passage 48 as formed on the control piston. This annular passage 48 is somewhat axially elongated so as to always be in direct communication with the transverse supply port 37.

The check valve 51 includes a sleevelike housing 52 which is threadibly received within the bore 46 upstream of the radial passage 47. This housing 52 has an opening therethrough in which is positioned a valve element 53, the latter being normally spring urged (upwardly in FIG. 2) into a closed position so as to prevent the backward or outward flow of pressure fluid from the pressure chamber 22. The structure of the check valve 51 is conventional since it is constructed substantially identical to the standard check valve associated with automobile tires.

The valve assembly 31 defines control chambers 54 and 55 disposed respectively adjacent the outer and inner ends of the bore 32, whereby the pressure fluid within these chambers hence acts against the end faces 43 and 44 of the control piston 42 so as to either maintain the valve ball (that is, the discharge valve) 45 in the closed position illustrated by FIG. 1, or permit this discharge valve 45 to be moved into an open position when the control piston 42 is moved upwardly so as to abut the stop surface 36. The movement of the control piston 42 between these two limit positions, however, can be an extremely small distance inasmuch as only a small movement of the valve ball 45 is required.

To control the valve assembly 31 and the spring unit 10, the spring unit is preferably connected to a pressure source in a manner as diagrammatically illustrated in FIG. 1. That is, there is preferably provided a storage tank or chamber 56 containing therein a quantity of high pressure gas, such as nitrogen at a pressure level of about 2000 psi. This tank 56 is normally a closed tank containing therein a predetermined quantity of high pressure gas. This tank 56 communicates with a supply line 57 which connects to a control element 58, such as a three-way valve, and the latter connects to a further supply line 59 which has the end thereof threadibly engaged within the threaded opening 35 of the fitting 34. The valve 58 can also connect to a drain line 61, which drain may merely be a vent to the atmosphere. The valve 58 is normally maintained in a condition whereby lines 57 and 59 communicate with one another so that pressure within storage tank 56 is supplied to the bore 32, and the drain line 61 is normally closed, whereby the spring unit 10 and valve assembly 32 will thus normally be maintained in the positions illustrated by FIGS. 1 and 2.

OPERATION

With the spring unit in the position illustrated by FIGS. 1 and 2, a high pressure gas can be supplied to the spring unit to charge same by connecting the unit as illustrated in FIG. 1, whereby the high pressure gas flows from the source or tank 56 into the bore 32, which high-pressure gas opens the one-way check valve 51 so that the pressure fluid then flows through supply port 37 into the pressure chamber 22. When the pressure chamber 22 reaches the desired pressure as controlled by a pressure regulator (not shown), or when the pressure within chamber 22 substantially equals but is normally slightly less than the pressure within the tank 56, then the pressure within the chamber 22 coupled with the spring force associated with the check valve 51 moves the check valve 51 into its closed position. The spring unit 10 is hence charged with a high pressure gas, specifically nitrogen, at a pressure level which may be as great as 2000 psi. The piston rod 14 will normally be in its fully extended position as illustrated by FIG. 1 so as to permit imposition of an impact force thereon. If the pressure level within chamber 22 should experience any significant decrease in pressure, such as due to leakage, than after a predetermined pressure drop, additional high pressure fluid will automatically be supplied from tank 56 into chamber 22 due to automatic opening of the check valve 51 as caused by the pressure imbalance thereacross.

When an impact load is imposed against the end of piston rod 14 so as to cause inward movement of piston 13 and hence at least limited compression of the high pressure gas within the chamber 22, the compressed gas normally remains trapped within the spring unit since the one-way check valve 51 prevents backward flow of gas therethrough, and the valve ball 45 remains seated against the valve seat 38. In this regard, the supply pressure from tank 56, which pressure is at a high level substantially equal to the initial charging pressure, is present within the control chamber 54 and hence acts against the end face 43 of the control piston 42. This urges the control piston 42 downwardly against the valve 45, and in turn holds the valve 45 sealingly engaged against the valve seat 38. The higher pressure within the chamber 22, when an impact load is imposed on the spring unit, is transmitted into the intermediate passage 39 and imposed against the valve ball 45. The pressure area on the ball 45, however, is equal to the cross-sectional area of the passage 39, and this area is normally only a small fraction of the cross-sectional area of the piston 42, such as only about one-fifth and in the illustrated embodiment only about one-tenth the piston cross-sectional area. The pressure force imposed on the ball 45 during normal operation of the spring unit 10 is hence incapable of moving the ball 45 upwardly against the downward urging of the control piston 42, and hence the ball valve 45 remains closed.

However, if a pressure in excess of a predetermined magnitude should be developed within the pressure chamber 22, such as a pressure in the order of 20,000 psi in the illustrated embodiment, then the high pressure in the passage 39 acting against the small area of ball 45 is sufficient to overcome the smaller pressure which acts against the larger area of end face 43, and hence the ball 45 and piston 42 are moved upwardly a limited extent. Some of the high pressure fluid then immediately flows from pressure chamber 22 through passage 39 into the lower control chamber 55. Since discharge passage 41 is of smaller cross section and hence acts as a flow restrictor, a pressure buildup occurs within control chamber 55 so as to positively maintain the piston 42 in its uppermost position against the stop surface 36. This hence permits the high pressure within chamber 22 to be relieved due to the pressure fluid flowing through passage 39 into control chamber 55, and hence through the discharge passage 41 into the surrounding environment. Since the pressure fluid from chamber 22 flows into control chamber 55 and pressurizes the latter, and acts against the end face 44 of the piston 42, the pressure in chamber 55 hence effectively overcomes or balances the pressure in the upper chamber 54 so that the piston 42 remains in its uppermost position until the pressure in the spring chamber 22 decreases to a safe operating level which is substantially equal to the initial charging pressure, at which point the pressure in the upper chamber 54 will exceed that in the lower chamber 55 so that the control piston 42 will again move downwardly so as to seat the valve ball 45 against the valve seat 38.

When it is desired to relieve the pressure from the spring unit, such as for maintenance purposes, the valve 58 can be manually moved so as to close off the supply pipe 57 and hence isolate the storage tank 56 from the spring unit. This hence results in supply pipe 59 being connected to the drain 61, and hence the bore 32 is exposed to atmospheric pressure. This thus relieves the pressure from the upper control chamber 54. Since the pressure within the pressure chamber 22 acts through passage 39 against the valve ball 45, this causes the valve ball 45 and the piston 42 to be moved upwardly into an open position until the piston abuts the stop surface 36. The high pressure fluid from chamber 22 then flows into the lower control chamber 55 and causes a pressure buildup therein due to the restriction caused by the discharge passage 41. The pressure hence acts against the lower and larger end face of the piston 42 so as to positively maintain it in its uppermost open position. The high pressure fluid in chamber 22 then flows through passage 39 into chamber 55, and thence through discharge passage 41 into the atmosphere. The valve assembly will be maintained in this open position until the pressure within chamber 22 substantially equals the surrounding atmospheric pressure.

Hence, the air spring unit can thus be utilized with high internal gas pressures therein so as to permit absorption of large forces, and at the same time the unit can handle such high pressures in a safe and controlled manner.

While the use of a valve 58 is illustrated solely for purposes of demonstrating one manner of isolating the storage tank and depressurizing the upper control chamber 54, nevertheless it will be appreciated that numerous other control arrangements or piping connections could be provided for accomplishing this purpose.

While the valve arrangement illustrated in FIG. 2 discloses the metal ball 45 being separate and independent of the control piston 42, it will be appreciated that the valve ball 45 and piston 42 could be fixedly joined together if desired, and in fact could be integrally formed. Further, the ball 45 could be replaced with a part which is integral with and projects axially from the control piston 42, which part would perform the same opening and closing function as the ball 45, but would do so by sliding into and out of the coaxially aligned end of passage 39 so as to selectively close and open the latter.

Figure 3:
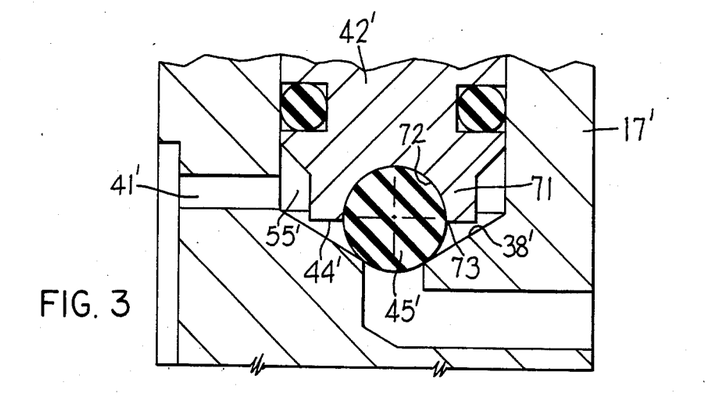
FIG. 3 is a fragmentary sectional view illustrating a variation of the valve arrangement shown in FIG. 2.

Referring now to FIG. 3, there is illustrated a variation of the valve arrangement, which variation relates specifically to the control piston and its cooperation with the valve ball. The parts shown in FIG. 3 which identically correspond to the same parts appearing in FIG. 2 have been designated by the same reference numerals but with the addition of a prime (') thereto.

The valve element or ball 45' in the FIG. 3 variation is constructed of an elastomeric material, rather than of metal. More specifically, the valve ball 45' is preferably constructed of polyurethane so as to provide the valve ball with at least limited elastomeric properties. However, the elastomeric material defining the valve ball 45' is hard and stiff so as to permit only limited deformation. To provide the desired properties, the polyurethane ball 35 preferably is provided with a Durometer hardness of about 90, although a Durometer hardness in the range of between about 70 and 100 is believed acceptable (the Durometer being a D scale rating). By providing the valve ball 45' with at least limited elasticity, this ensures that a proper annular seal is achieved between the ball 45' and the valve seat 38' in complete surrounding relationship to the intermediate passage 39', which seal must be maintained even when a high pressure level in the order of 2000 psi is experienced within the main pressure chamber 22.

To prevent the elastomeric ball 45' from undergoing a permanent deformation into a nonspherical condition, the valve ball 45' is preferably seated within a substantially semi-spherical valve seat 72 which is formed in the inner end of the control piston 42'. The piston 42' is provided with a reduced diameter portion 71 extending axially from the inner end thereof so as to permit formation of the valve seat 72 therein, and hence provide for supportive engagement with the elastomeric ball 45'. The provision of this valve seat 72 hence ensures that the control piston 42' supportingly engages the ball 45' over substantially one-half the exterior spherical area thereof, and hence minimizes the unit area pressure imposed on the elastomeric ball.

In the preferred embodiment, the depth of the seat or recess 72 preferably slightly exceeds the diameter of the valve ball 45', although the contour of the valve seat 72 is preferably generated on the same radius as the valve ball 45'. This hence results in the end surface 44' of the piston being disposed slightly below the center of the valve ball 45'. The inner edge 73 of the end surface 44' is preferably deformed inwardly a small extent to capture the ball 45' within the recess 72 and hence prevent separation therebetween.

Initial experimental test results connected of the valve arrangement of FIG. 3 have proven that such an arrangement can successfully seal the intermediate passage 39', even when the latter contains a high pressure therein, and at the same time the valve ball 45' can successfully undergo a large number of operational cycles, and can additionally be maintained in a closed position for long periods of time, without undergoing excessive wear or experiencing any permanent deformation which interferes with the proper operation of the valve arrangement.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a gas spring arrangement comprising:
   a gas spring unit having a housing, a piston rod means relatively slidably supported within said housing and projecting outwardly therefrom, the piston rod means being slidably movable relative to the housing between a first position wherein the rod means extends outwardly of the housing through a substantial extent and a second position wherein the rod means is substantially telescoped within the housing, the housing and the rod means cooperating to define a pressure chamber therebetween for containing a quantity of high-pressure gas therein;

first passage means formed at least partially in said housing and communicating with said pressure chamber for supplying high-pressure gas thereto;

one-way check valve means associated with said first passage means for permitting high-pressure gas to be supplied into said pressure chamber while preventing flow of said gas in the opposite direction;

second passage means formed at least partially in said housing for providing communication between said pressure chamber and a low-pressure discharge point, such as the atmosphere, said second passage means being independent of and isolated from said first passage means;

flow-control valve means associated with said second passage means for controlling flow of pressure fluid therethrough from said pressure chamber to said low-pressure point; and control means for controlling movement of said flow-control valve means between open and closed positions, said control means including first means responding to the pressure in the first passage means upstream of said check valve means and second means responding to the pressure in the second passage means downstream of said flow-control valve reans for controlling movement of said flow-control valve means between said open and closed positions.

2. A combination according to claim 1, wherein the control means includes a control piston shiftable between one end position wherein it engages and holds said flow-control valve means in its closed position and a second end position wherein it permits said flow control valve means to be opened, said first and second means respectively comprising first and second pressure faces as defined on said control piston, said first pressure face being exposed to and acted on by the pressure within said first passage means upstream of said check valve means, said second pressure face being exposed to and acted upon solely by the pressure within said second passage means downstream of said flow control valve means.

3. A combination according to claim 2, wherein the first and second passage means respectively include first and second intermediate control chambers for receiving therein the pressure gas, said first and second pressure faces being disposed within and exposed to the pressure gas within the respective first and second control chambers, said second passage means including an intermediate passage which extends from said pressure chamber to said second control chamber, said intermediate passage having a surrounding valve seat associated therewith at its intersection with said second control chamber, said flow-control valve means including a movable valve element disposed for engagement with said valve seat, said second passage means also including a discharge passage which communicates between said second control chamber and said low-pressure point, said discharge passage having a cross-sectional area which is significantly smaller than the cross-sectional area of said intermediate passage, and said intermediate passage in the vicinity of said valve seat having a cross-sectional area which is significantly smaller than the pressure area defined by said first pressure face.

4. A combination according to claim 3, wherein said first and second pressure faces are formed on opposite axial ends of said control piston and are axially directed outwardly in opposite directions, said first and second pressure faces being, of about the same area, said valve seat being disposed in axially opposed relationship to said second pressure face, and said valve element being disposed between said valve seat and said second pressure face so that said control piston maintains said valve element seated against said valve seat when the control piston is in a first end position.

5. A combination according to claim 4, including external tank means containing therein a quantity of high pressure gas, said tank means being maintained in continuous communication with said first passage means so that the high pressure gas from said tank means is continuously supplied to said first control chamber.

6. A combination according to claim 5, wherein said one-way check valve means is mounted on said control piston.

7. A combination according to claim 4, wherein said one-way check valve means is mounted on said control piston.

8. A combination according to claim 4, wherein said valve element comprises a valve which is disposed within said second control chamber and is sealingly engageable with said valve seat, said valve ball being maintained in engagement with said control piston so that the latter normally maintains the valve ball in sealing engagement with said valve seat.

9. A combination according to claim 8, wherein said valve ball is constructed of an elastomeric material having a Durometer hardness in the range of about 70 to about 100, and wherein said control piston has a recess of a substantially semi-spherical configuration formed in the end thereof, said valve ball and said recess being of substantially the same diameter, and said valve ball being seated within said recess.

10. A combination according to claim 3, including external tank means containing therein a quantity of high pressure gas, said tank means being maintained in continuous communication with said first passage means so that the high pressure gas from said tank means is continuously supplied to said first control chamber.

11. A combination according to claim 1, wherein said check valve means, said flow control valve means and said control means are all movably supported on said housing.

12. A combination according to claim 1, wherein said second passage means is free of annular elastomeric seal rings.

13. A combination according to claim 12, wherein said one-way check valve means is spring urged into a normally closed position.

14. A gas spring arrangement, comprising in combination:

a high-pressure gas spring unit having a housing and a piston rod means relatively slidably supported within said housing and projecting outwardly thereof, the piston rod means and the housing cooperating to define a pressure chamber therebetween for confining a high-pressure gas;

inlet passage means formed in said housing for communication with said pressure chamber, said inlet passage means being adapted for communication with an external source of high-pressure gas;

one-way check valve means associated with said inlet passage means for permitting flow of high-pressure gas through said inlet passage means into said pressure chamber, said check valve means preventing flow in the opposite direction;

discharge passage means formed in said housing and providing communication between said pressure chamber and a low-pressure discharge point externally of said housing, said discharge passage means being separate from said inlet passage means; and discharge flow-control valve means mounted on said housing and associated with said discharge passage means for selectively controlling flow of pressure gas therethrough from said pressure chamber to said discharge point, said discharge valve means including a valve element which is movable between open and closed positions, and said discharge valve means including a control member which responds to the presence of a significant pressure within said inlet passage means upstream of said check valve means for normally maintaining said valve element in its closed position.

15. A combination according to claim 14, wherein there is provided an external storage tank means containing therein a quantity of high-pressure gas, said tank means being in fluid communication with said inlet passage means upstream of said check valve means.

16. A combination according to claim 14, wherein said discharge passage means includes first and second passages which are formed in said housing and communicate with an intermediate chamber, said first passage communicating with said pressure chamber, said second passage communicating with the discharge point and being of smaller cross section than said first passage, said valve element being disposed within said intermediate chamber and engageable with a valve seat formed at the discharge end of said first passage, and said control member being responsive to the pressure of the fluid within said intermediate chamber for maintaining the control member in a limit position which permits said valve element to remain open.

17. A combination according to claim 14, wherein said control member, comprises a pistonlike member which is slidably and sealingly supported for movement within a bore as formed in said housing, said bore at one end communicating with said inlet passage means so that said pistonlike member has an end face thereon which is exposed to the pressure of the gas within sard inlet passage me,ans at a location upstream of said check valve means, said inlet passage means including an opening which projects axially into said pistonlike member, said one-way check valve means being mounted on said pistonlike member within said opening, said bore at the other end thereof communicating with and defining a part of said discharge passage means, said valve element being disposed within the other end of said bore and operatively associated with the pistonlike member so that the valve element is maintained in its closed position when the pistonlike member is in one limit position, movement of said pistonlike member into its other limit position enabling said valve element to be moved into an open position.

18. A combination according to claim 17, wherein there is provided an external storage tank means containing therein a quantity of high-pressure gas, said tank means being in fluid communication with said inlet passage means upstream of said check valve means.

19. A combination according to claim 17, wherein said valve element comprises a spherical ball.

20. A combination according to claim 19, wherein said spherical ball is constructed of a relatively stiff elastomeric material, said spherical ball being seated within a substantially semi-spherical recess formed in the adjacent end of said pistonlike member, said semi-spherical recess being of a diameter substantially equal to the diameter of said spherical ball.

21. A high-pressure gas spring, comprising:

a housing defining therein an interior compartment, said housing including an annular side wall and a pair of end caps fixedly secured to said annular side wall adjacent the opposite ends thereof;

piston means slidably supported within said housing for displacement longitudinally thereof, said piston means having rod means secured thereto and slidably projecting axially outwardly from one end of said housing, said piston means and said housing cooperating to define a pressure chamber which is charged with a high-pressure gas;

first passage means extending through one of said end caps for communication with said pressure chamber, and one-way check valve means mounted in said first passage means for permitting high-pressure gas to be supplied through said first passage means into said chamber while preventing flow of gas in the opposite direction, said first passage means including an upstream passage which communicates with the upstream end of said one-way check valve means and a downstream passage which extends from said check valve means to said pressure chamber;

second passage means extending through said one end cap for providing communication between said pressure chamber and the surrounding environment, said second passage means including an inner passage which extends from the pressure chamber to an intermediate passage, and an outer passage which extends from the intermediate passage to the surrounding environment, said second passage means having a valve seat associated therewith substantially at said intermediate passage;

discharge valve means associated with said second passage means for controlling flow therethrough to the environment, said discharge valve means including a discharge valve element movably supported on said housing and disposed for seating engagement with said valve seat, said discharge valve element being movable between open and closed positions, said discharge valve element when in said closed position being disposed so that the pressure of the gas within said inner passage is imposed thereon and tends to move the valve element towards its open position; and pressure-responsive control means for controlling the position of said discharge valve element, said control means including a bore formed in said one end cap in communication between said upstream passage and said intermediate passage, said control means also including a control piston means slidably and sealingly engaged within said bore for preventing any communication of gas between said first and second passage means through said bore, said control piston means having first and second pressure faces on opposite ends thereof which are exposed to the pressure of the gas disposed in said inlet passage and said intermediate passage respectively, said control piston means cooperating with said valve element to normally maintain the latter in its closed position.

22. A combination according to claim 21, wherein said one-way check valve means is mounted within said control piston means.

23. In a high-pressure gas spring arrangement having a housing and a piston rod relatively slidably supported within the housing and projecting outwardly therefrom, the piston rod and housing cooperating to define a pressure chamber therebetween for containing a quantity of high pressure gas, the improvement comprising:

first passage means formed at least partially in said housing and communicating with said pressure chamber for supplying high-pressure gas thereto;

one-way check valve means associated with said first passage means for permitting high-pressure gas to be supplied into said pressure chamber while preventing flow of gas in the opposite direction, said one-way check valve means being normally spring urged into a closed position;

said first passage means including a first inlet passage which communicates with the upstream side of said one-way check valve means and a second inlet passage which communicates with the downstream side of said one-way check valve means, said second inlet passage being disposed in communication with said pressure chamber;

second passage means formed at least partially in said housing for providing communication between said pressure chamber and a low-pressure discharge point, such as the atmosphere, for permitting discharge of gas from said pressure chamber;

flow-control valve means associated with said second passage means for controlling flow of gas therethrough from said pressure chamber to said low-pressure point, said flow-control valve means including a movable valve member;

said second passage means including a first discharge passage which communicates with said pressure chamber and terminates at a valve seat, said movable valve member being normally maintained in sealing engagement with said valve seat to prevent flow through said first discharge passage, and a second discharge passage extending from downstream of said movable valve member to said low-pressure discharge point, said first discharge passage in the vicinity of said valve seat and said movable valve member being exposed solely to the gas which is discharged from the pressure charber and being totally independent of and isolated from the gas which is supplied through said first passage means;

said second passage means being free of annular elastomeric sealing rings; and control means for controlling the movement of said flow-control valve means between open and closed positions, said control means including first means responding to the pressure in the first passage means upstream of said check valve means for normally maintaining the movable valve member in sealing engagement with the valve seat.

* * * * *

UNITED STATES PATENT AND TRADEMARK OFFICE
CERTIFICATE OF CORRECTION

PATENT NO. : 4 662 616
DATED : May 5, 1987
INVENTOR(S) : Ransom J. HENNELLS

It is certified that error appears in the above-identified patent and that said Letters Patent is hereby corrected as shown below:

Column 10, line 21; before "which" insert ---ball---.

Column 11, line 43; change "sard" to ---said---.

Column 14, line 16; change "charber" to ---chamber---.

Signed and Sealed this

Sixteenth Day of February, 1988

Attest:

DONALD J. QUIGG

Attesting Officer

Commissioner of Patents and Trademarks